July 5, 1932.    J. McC. EDWARDS    1,866,092
LUBRICATING MEANS FOR CENTRIFUGAL LIQUID SEPARATOR MECHANISM
Filed Feb. 19, 1930
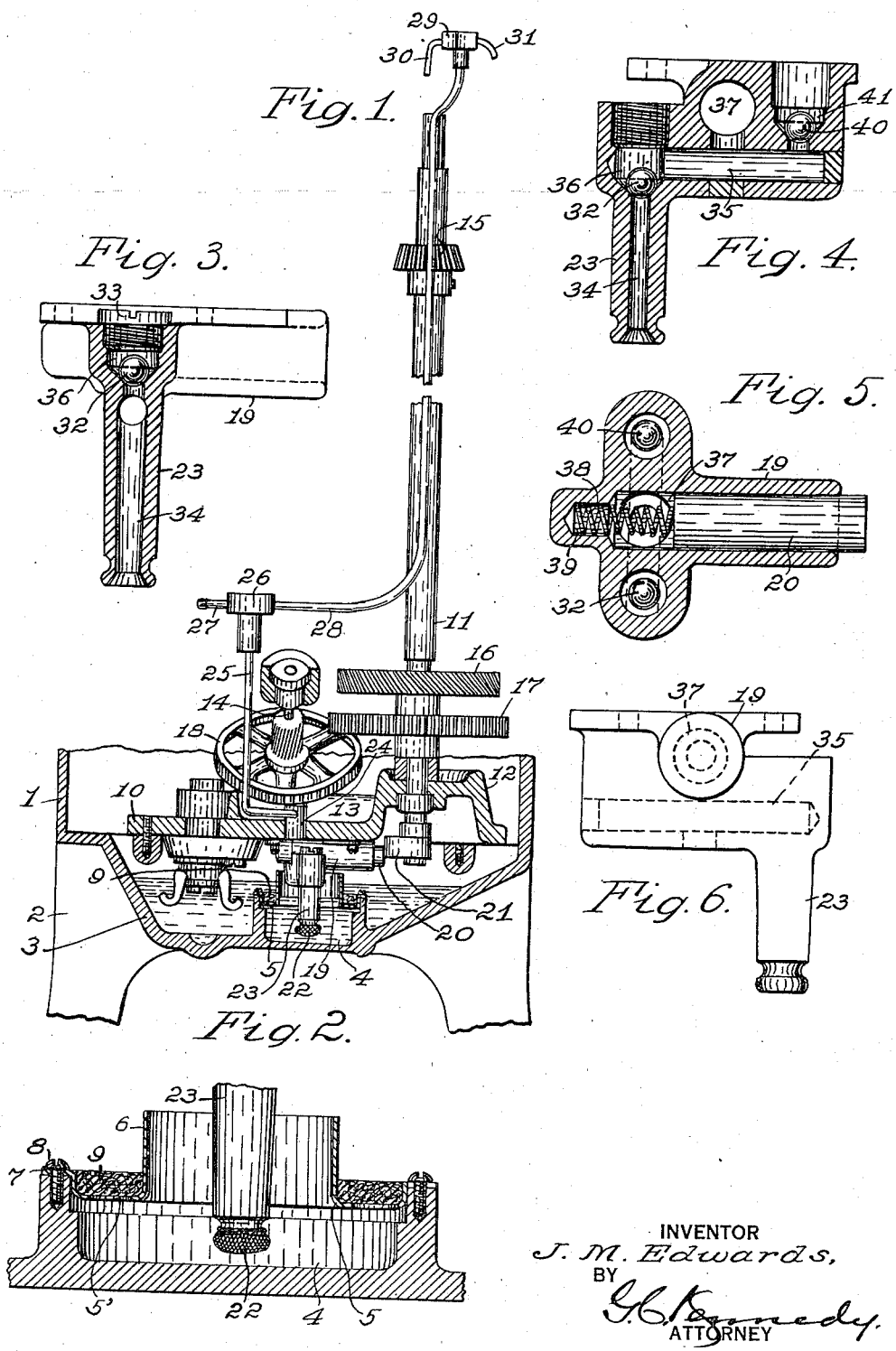
INVENTOR
J. M. Edwards,
BY
ATTORNEY

UNITED STATES PATENT OFFICE

JAMES McCOSH EDWARDS, OF CEDAR HEIGHTS, IOWA, ASSIGNOR TO ASSOCIATED MANUFACTURERS CORPORATION OF AMERICA, OF WATERLOO, IOWA

LUBRICATING MEANS FOR CENTRIFUGAL LIQUID SEPARATOR MECHANISM

Application filed February 19, 1930. Serial No. 429,731.

My invention relates to improvements in lubricating means for the driving mechanism of centrifugal liquid separators, and the object of my improvement is to supply force-feed means therefor, which include means for straining and purifying a liquid lubricant used, to permit it to be used repeatedly in service.

This object I have accomplished by the means which are hereinafter described and claimed, and which are illustrated in the accompanying drawing, in which Fig. 1 is an elevation with elements broken away or removed, of the driving mechanism for a centrifugal liquid separator, including the force-feed lubricating means associated operatively therewith. Fig. 2 is an enlarged central vertical cross section of the sump and strainer therefor of said devices. Figs. 3, 4 and 5 are various enlarged cross sections of the pumping device, and Fig. 6 is a side elevation thereof.

It is to be understood that the applicant reserves the right to variously modify the construction of said lubricating means and its adaptation to various types of mechanisms other than that shown, without departing from the scope of this invention or from the protection of the appended claim.

The driving mechanism of a centrifugal liquid or cream separator is designed for rapid operation, so that the separator bowl may be rotated at any high speed, for example, at ten thousand revolutions per minute. It is therefore especially necessary that all the bearings of moving elements of the mechanism be kept constantly well lubricated with pure flowable oil lubricant free from impurities, sediment, or particles of removed metals taken by friction from the contacting moving parts. Otherwise, these parts will rapidly wear and require replacement, while the efficiency of the machine will be affected.

As the driving mechanism for the separator bowl must be positioned therebelow, and housed in as limited a space as possible, it is necessary for the auxiliary lubricating device be as compact as possible, and that the pump thereof be very simple and small as combined therewith and with the mechanism and the housing..

In the exemplification of said Fig. 1, the numeral 1 denotes the hollow housing of a centrifugal liquid separator driving mechanism, the usually superposed separator bowl and associated contrivances not being shown, and said housing may or may not be supported on legs 2 or other supporting means. In the lower part of said housing is removably fastened a basal element 10 spaced above the depending and hollowed bottom 3 of the housing, which latter includes a cup-shaped central sump 4 having an annular interior shoulder, and above the shoulder a ring-shaped trough 5 containing a felted or porous straining material 9, the outer annular flattened edge or rim 7 of the trough being mounted and secured on the upper annular edge of the cup by screws 8. The inner vertical rim of the trough is raised a desired distance above its said outer rim.

Within the housing and stepped in a bearing seat in the base member 10 is a vertical rotable shaft 11. The seat part of said base is preferably raised above the body thereof and cupped at the top to receive oil dropped from above in a misty condition as hereinafter described. Also, the base 10 may have a cupped part 13 to likewise receive some of the dropped lubricant, to serve as a constant stock to lubricate the bearing of a rotatable stock element 14 and 18 stepped therein. The shaft 11 may carry gears 16 and 17 a little above the cupped part 12 as also a bevel-gear 15 near its top, plus other mechanisms not shown on or associated with the shaft, such as a collar-bearing therefor or a bearing for a crank-shaft, these being well known in this art, and therefore not herein shown or further described.

The force-feed lubricator is thus described. Secured to the under face of the basal member 10 is a pumping cylinder 19, shown in longitudinal section in Fig. 1 and containing a solid cylindrical plunger piston 20 reciprocatory therein and to project beyond an open end of the cylinder and kept in rubbing contact with a cam 21 on the lower end of the shaft 11, tensioned by a compression spring 38 in the cylinder hollow. The pump casing includes a hollow depending inlet tube 23 having its lower end dipping into the oil contents of the sump cup 4 below the strainer 9, and itself having a bottom strainer 22 of finely meshed wire.

As shown also in said Figs. 3 and 4, the upper end of the passage 34 through the inlet tube 23 is controlled by a ball check-valve 32, and the pump casing has a horizontal passage 35 leading from above said check-valve to a passage 41 into a riser 24 controlled by another ball check-valve 40, a short vertical passage leading upwardly from the passage 35 into the pump cylinder hollow 37. The chamber 36 above the check-valve 32 is closed by a removable threaded screw 33. The left-hand end of the cylinder bore 37 is diminished at 39 to more closely embrace and prevent displacement from its central position of the said spring 38.

The riser 24 extends into the upper sump 13 and a bent tube 25 projects therefrom horizontally and then vertically and is crowned at the top by a hollow distributing or supply chamber 26 having a short drip tube 27 and a longer and bent tube 28, the latter extending horizontally and then vertically upwardly above the top of the shaft and being crowned by a hollow supply chamber 29 having oppositely disposed drip tubes 30 and 31, the latter adapted to deliver purified oil downwardly upon a neck bearing and a crank-shaft bearing not shown, as hereinbefore mentioned.

After an initial supply of lubricating oil has been placed in the sump 5 to immerse the lower part of the pump inlet tube 23 and its terminal strainer 22, the shaft 11 may be placed in rotation to cause the cam 21 to pushingly actuate the plunger piston 20, the latter being returned by the reacting spring 38. As the plunger 20 returns a suction is set up in the chambers 35 and 36, retaining the valve 40 on its seat while the valve 32 lifts and the chambers 34, 36 and 35 fill with oil. On the next stroke the plunger closes the valve 32 and pushes up the valve 40 to discharge the oil from the chamber 35 into the riser 24, tube 25, chamber 26, tube 28, chamber 29, whereby oil is forced out of the drip tubes 27, 30 and 31, to drop the lubricant downwardly upon said gearing which by centrifugal force reduces the oil to a falling mist which thoroughly lubricates all the bearings in returning to the bottom of the housing and the sump 5. In passing into the sump 5 the oil is strained by the filter 9, and the strainer 22 further purifies the oil in the circulation of the device from metal grit and sediments. Thus the oil is kept usable a long time without renewal.

Having described my invention, what I claim as new, and desire to secure by Letters Patent, is:

In combination, a closed housing, driving mechanism of a centrifugal liquid separator therein, including a rotary shaft and a pumping device, said pumping device having an open end pumping cylinder and a reactively resiliently controlled imperforate plunger piston therein to project therefrom, a cam on said shaft engaging and adapted to actuate said piston, valvular devices in said pumping device to respectively control the inlet and outlet of the cylinder, a strainer covering said inlet, a distributing branching conduit in communication with said outlet and adapted to deliver a liquid lubricant from said pumping device upon different elements of said mechanism, and a sump in said housing containing a strainer septum for lubricant returned from said mechanism, the pump inlet being immersed in the strained lubricant below said strainer septum.

In testimony whereof I affix my signature.

JAMES McCOSH EDWARDS.